United States Patent
Sung et al.

(10) Patent No.: US 12,423,914 B2
(45) Date of Patent: Sep. 23, 2025

(54) DEVICE AND METHOD WITH SCENE VIEW IMAGE GENERATION

(71) Applicant: SAMSUNG ELECTRONICS CO., LTD., Suwon-si (KR)

(72) Inventors: Kapje Sung, Suwon-si (KR); Daeul Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 256 days.

(21) Appl. No.: 18/193,747

(22) Filed: Mar. 31, 2023

(65) Prior Publication Data
US 2024/0153208 A1    May 9, 2024

(30) Foreign Application Priority Data
Nov. 4, 2022    (KR) .......................... 10-2022-0146425

(51) Int. Cl.
*G06T 17/20*    (2006.01)
*G06T 7/20*    (2017.01)
*G06V 20/56*    (2022.01)

(52) U.S. Cl.
CPC ............... *G06T 17/20* (2013.01); *G06T 7/20* (2013.01); *G06V 20/56* (2022.01); *G06T 2207/30252* (2013.01)

(58) Field of Classification Search
CPC . G06T 17/20; G06T 7/20; G06T 2207/30252; G06V 20/56
See application file for complete search history.

(56) References Cited

U.S. PATENT DOCUMENTS

| 5,936,671 | A | 8/1999 | Van Beek et al. |
| 10,315,054 | B2 | 6/2019 | Mead et al. |
| 10,498,966 | B2 | 12/2019 | Wheeler et al. |
| 10,659,690 | B2 | 5/2020 | Hu et al. |
| 2014/0198184 | A1* | 7/2014 | Stein ............... H04N 23/69 348/47 |
| 2019/0020802 | A1 | 1/2019 | Melkote Krishnaprasad et al. |
| 2020/0059601 | A1* | 2/2020 | Cope ............... H04N 23/6812 |
| 2021/0392316 | A1* | 12/2021 | Bleyer ............... G06T 7/593 |
| 2023/0143034 | A1* | 5/2023 | Wu ............... G06T 7/50 345/423 |

FOREIGN PATENT DOCUMENTS

KR    10-1376936 B1    3/2014

OTHER PUBLICATIONS

Wu, Huicong, et al. "Simultaneous Video Stabilization and Rolling Shutter Removal." IEEE Transactions on Image Processing 30 (2021): 4637-4652.
Extended European search report issued on Nov. 29, 2023, in counterpart European Patnent Application No. 23168976.1 (14 pages).

* cited by examiner

Primary Examiner — Kee M Tung
Assistant Examiner — Xiaoming We
(74) Attorney, Agent, or Firm — NSIP Law

(57) ABSTRACT

An electronic device includes: a camera sensor, disposed on a body, and configured to generate an image including image data by sequentially scanning scan lines; and memory storing instructions configured to cause a processor to: obtain a default mesh with vertices corresponding to positions of image pixels along a scan line of the camera sensor and back-projected onto a target plane, obtain a planar mesh from the default mesh according to motion of the body, and generate a scene view image from the image data based on the obtained planar mesh.

20 Claims, 16 Drawing Sheets

DEVICE AND METHOD WITH SCENE VIEW IMAGE GENERATION

CROSS-REFERENCE TO RELATED APPLICATIONS

This application claims the benefit under 35 USC § 119(a) of Korean Patent Application No. 10-2022-0146425, filed on Nov. 4, 2022, in the Korean Intellectual Property Office, the entire disclosure of which is incorporated herein by reference for all purposes.

BACKGROUND

1. Field

The following description relates to generation of a scene view image.

2. Description of Related Art

Recently, advanced driver assistance systems (ADAS) are mounted on vehicles to enhance driving safety. Such ADASs often include a lane departure warning system (LDWS), a forward collision warning system (FCWS), a driver drowsiness detection system, a pedestrian detection (PD) system, a traffic sign recognition (TSR) system, a blind-spot view monitoring (BVM) system, a surround view monitoring (SVM) system, and the like.

A vehicle provided with an SVM system may provide a top-view image by using an image captured through a camera sensor including a fisheye lens.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic device includes: a camera sensor, disposed on a body, and configured to generate an image including image data by sequentially scanning scan lines; and memory storing instructions configured to cause a processor to: obtain a default mesh with vertices corresponding to positions of image pixels along a scan line of the camera sensor and back-projected onto a target plane, obtain a planar mesh from the default mesh according to motion of the body, and generate a scene view image from the image data based on the obtained planar mesh.

The instructions may be further configured to cause the processor to: obtain the planar mesh by moving a group of vertices of the default mesh that correspond to a same scan line captured at a scan time point, wherein the moving is based on motion of the body corresponding to the scan time point.

The instructions may be further configured to cause the processor to: obtain motions of the body, the motions of the body respectively corresponding to scan time points when lines of the image data were captured by respective scan lines of the camera sensor; obtain the planar mesh by: for each time point, moving vertices associated with a corresponding scan line according to a displacement that is based on a difference between the corresponding motion of the body at the scan time point and a motion of the body at a reference time point.

The instructions may be further configured to cause the processor to: when the body is moving in a straight line, obtain the planar mesh by moving vertices, in the default mesh, and corresponding to a scan line scanned at a scan time point subsequent to the reference time point, in a direction corresponding to the straight line movement of the body.

The instructions may be further configured to cause the processor to: obtain the planar mesh by moving vertices corresponding to a same scan time point in the default mesh using a transformation matrix that is a rigid body transformation corresponding to the motion of the body.

The instructions may be further configured to cause the processor to: obtain the planar mesh by not-moving vertices in the default mesh that correspond to a reference time point and by moving other vertices of the default mesh based on the motion of the body.

The instructions may be further configured to cause the processor to: generate the scene view image from the image data based on a mapping relationship between image pixels of the image data and vertices of the planar mesh.

The instructions may be further configured to cause the processor to: determine image information, corresponding to either positions of the vertices or a surrounding position on the target plane, based on pixel values of image pixels mapped to the vertices of the planar mesh in the image data; and generate the scene view image based on the determined image information.

Image pixels mapped to at least two vertices among vertices adjacent to each other in the planar mesh may be positioned along the same scan line.

Vertices included in the planar mesh may be mapped to image pixels belonging to a portion of a field of view of the camera sensor overlapping the target plane.

Image pixels corresponding to a same scan line may be spaced apart from each other at regular intervals along a line within the image data.

Vertices of the default mesh may be disposed at positions back-projected onto the target plane along directions from a sensing element corresponding to an image pixel mapped to a corresponding vertex toward an origin of the camera sensor based on a position of the camera sensor with respect to the body.

The body may be a vehicle and the electronic device may be mounted on, affixed to, or incorporated in the vehicle, and the camera sensor may be positioned at a front surface, rear surface, or side surface of the vehicle.

The instructions may be further configured to cause the processor to: identify a road marking from the generated scene view image.

The instructions may be further configured to cause the processor to: generate the scene view image having a view, including at least a partial region included in a viewing angle of the camera sensor, in the target plane, from a view point of the camera sensor.

The instructions may be further configured to cause the processor to: generate, as the scene view image, a top-view image of a region, including at least a portion of the planar mesh on the target plane, the top-view image corresponding to a view looking directly down on the target plane; and output the top-view image through a display.

In another general aspect, a processor-implemented method includes: receiving an image, the image having been generated by a rolling shutter camera sensor that sequentially scans lines in a camera incorporated in a moving apparatus; obtaining a planar mesh by using a default mesh including vertices corresponding to positions where image pixels along a scan line of the camera sensor may be back-projected onto a target plane and by using a motion of the moving apparatus; and generating a scene view image from the image data based on the obtained planar mesh.

In another general aspect, a method comprises: obtaining an image captured by a rolling shutter camera that is moving through physical space, wherein lines of the image are captured at respective line capture times while the rolling shutter camera is moving; forming a planar mesh by, for each group of vertices of an initial mesh, translating the vertices of groups in the initial mesh based on motion of the rolling shutter camera at the respective line capture times of the groups, wherein the translation of the vertices in a group depends on the motion of the rolling shutter camera at the group's line capture time; and generating an image based on the planar mesh.

The vertices are arranged by back-projecting based on camera parameters of the rolling shutter camera.

The vertices of the initial mesh may be co-planar with respect to each other, and the vertices of the planar mesh may be co-planar with respect to each other.

Other features and aspects will be apparent from the following detailed description, the drawings, and the claims.

Figure 1:
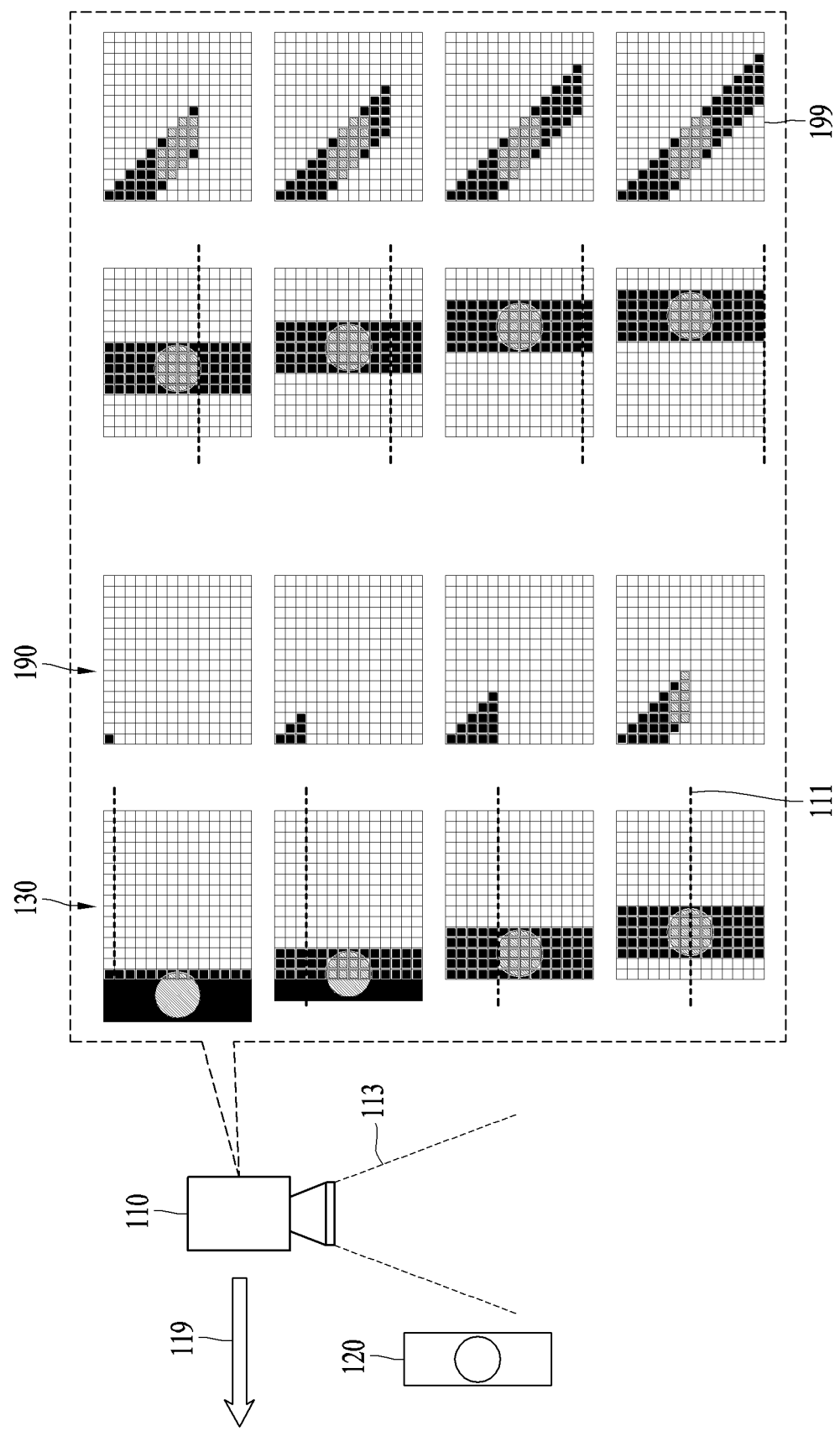
FIG. 1 illustrates an example of generating image data with a rolling shutter camera sensor, according to one or more example embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example of generating image data with a rolling shutter camera sensor, according to one or more example embodiments.

A rolling shutter camera sensor 110 scans (e.g., "rolls down") an image sensor, line by line. That is, each scan line of the sensor is sensed or captured at a different time. The camera sensor 110 may generate image data (e.g., raw image data 199) by sequentially scanning the scan lines. Generation of image data by sequentially selecting scan lines is described later along with the configuration of the camera sensor 110.

The camera sensor 110 includes a lens and an image sensor. The lens transmits light rays received from a scene corresponding to a viewing angle 113 of the lens to sensing elements (e.g., photodiodes) in the image sensor. The lens focuses the light rays of the scene on the image sensor.

The image sensor senses the light rays passing through the lens. A sensing element of the image sensor detects an intensity (a brightness) of a light ray. For example, the image sensor may include a color filter array in which color filters are arranged and an array (e.g., a sensing element array) in which sensing elements are arranged. The color filter may pass light in a predetermined wavelength band (e.g., a red band, blue band, and green band). Each sensing element detects the intensity of light passing through the color filter. Each sensing element detects an intensity value of a color corresponding to a wavelength band of light passing through a corresponding color filter (e.g., a brightness of a corresponding color). Image data obtained as described above may be referred to as raw data or raw image data 199. In some implementations, the raw image data 199 may be data before being demosaiced to a color image. When the color filter array has a Bayer pattern, the raw image data 199 may be a Bayer pattern image. Other patterns may be used, and techniques described herein may be used with other types of image data. For example, the image data may be monochromatic or grayscale image data captured by infrared image sensor. Generally, the term "image data" as used herein refers to image data of (or derived from) one image-capture of the image/camera sensor.

The image sensor sequentially scans sensing elements in units of lines according to a rolling shutter. The camera sensor 110 scans a scan line 111 by determining (capturing) sensing values of sensing elements arranged in the scan line 111. The scan line 111 is a line in which the sensing elements scanned by the image sensor at an arbitrary time point are arranged and may be, for example, a line along an axis (e.g., a vertical axis or horizontal axis) of the image sensor. The image sensor may sequentially select scan lines in a scan direction (e.g., a direction from the top to the bottom) from a reference time point. For example, the scan line may be sequentially selected from a scan line on one side (e.g., an upper side) of the image sensor to a scan line on the other side (e.g., a lower side). The scan line 111 may be a row line or a column line, depending on the scanning direction. The image sensor may generate the raw image data 199 by reading sensing values of the sensing elements corresponding to the scan line 111 selected at each time point when an image (e.g., raw image data 199) is captured. As the scanning is performed along the scan line 111, pixel values of image pixels (e.g., raw image pixels) of the raw image data 199 may be determined sequentially in units of lines.

FIG. 1 shows an example in which the camera sensor 110 physically moves (e.g., translates) in a direction 119 and in which an object 120 is fixed. Since the camera sensor 110 moves in the direction 119 (e.g., to the left) with respect to the fixed object 120, the object 120 is captured as if the object 120 moves in the other direction (e.g., to the right) with respect to the camera sensor 110. That is, the camera sensor 110 and the object 120 move relative to each other. The camera sensor 110 may capture the object 120 moving in the other direction within the viewing angle 113 of the camera sensor 110. Put another way, the camera sensor 110 and the object 120 move relative to each other. As described above, the rolling shutter image sensor does not capture the entire sensing region at one instant but rather sequentially captures the sensing region in units of scan lines 111.

During the relative movement of the object with respect to the camera sensor 110, image pixel values of image data 190 may be filled in line by line during scanning 130 at different time points. For example, at a time point ① the image sensor may scan sensing values of the sensing elements corresponding to a scan line on an topmost line of the image sensor. In other words, the pixel values of the image pixels in the uppermost line (e.g., an uppermost row line) in the raw image data 199 may be captured. After the time point ①, the camera sensor 110 may sequentially sweep the scan lines from a time point ② to a time point ⑧. At the time point ②, the image pixel values of a scan line below that at the time point ① are captured for a position of the object 120 that has moved in the other direction compared to its position at the time point ①. As time elapses, the image pixel values corresponding to a scan line lower than a previous time point may be sensed for respectively moved positions of the object 120. Therefore, in the rolling shutter method, image data of the object 120 in the raw image data 199 appears to be curved or warped due to the relative movement of the camera sensor 110 and the object 120 as the raw image data 199 is captured. Such distortion occurs because the rolling shutter camera scans the raw image data 199 vertically or horizontally, one line at a time, over multiple time points. An operation of generating a scene view image by using a mesh that accounts for such distortion in the raw image data 199 is described with reference to FIG. 2.

For reference, herein, examples in which the image data is the raw image data 199 and the image pixel is a pixel of the raw image data 199 will be mainly described, although any image data derived from the camera sensor may be used (e.g., image data that has been subjected to image processing filters, etc.). The viewing angle 113 of the camera sensor 110 may be determined based on an optical specification (e.g., a focal length) of the imaging optical lens and a size (e.g., a length of an axis of the sensing element array) of the image sensor.

Figure 2:
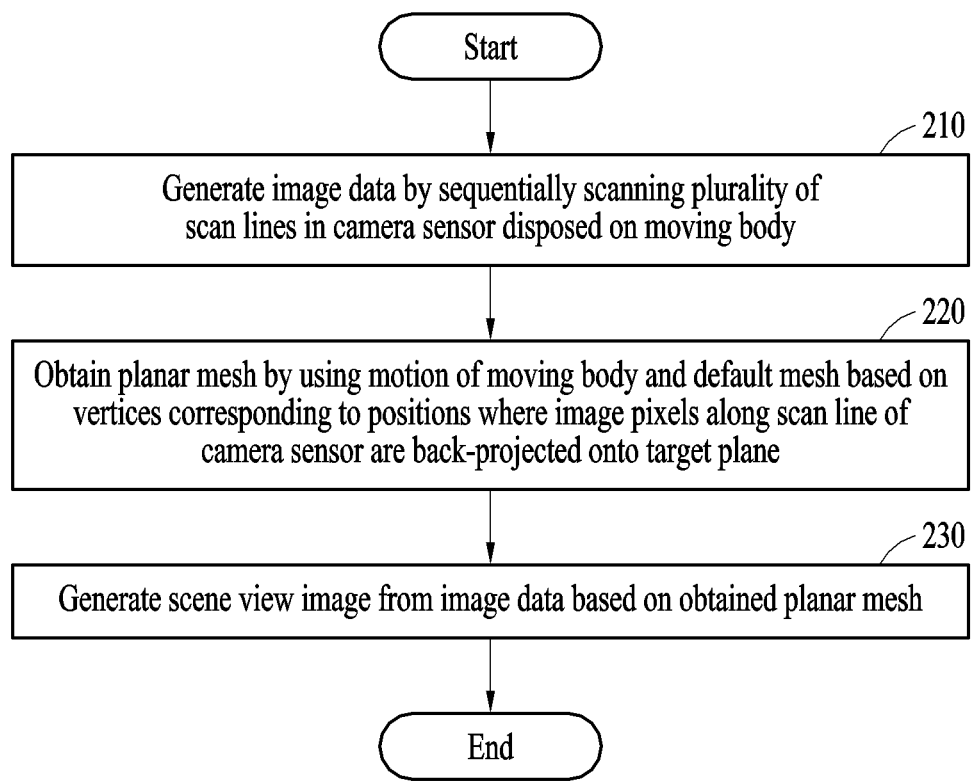
FIG. 2 illustrates an example process of generating a scene view image from image data, according to one or more example embodiments.

FIG. 2 illustrates an example process of generating a scene view image from image data, according to one or more example embodiments.

In operation 210, the electronic device may generate image data by sequentially scanning scan lines in a moving camera sensor. For example, the camera sensor may be of the rolling shutter type described with reference to FIG. 1.

In operation 220, the electronic device may obtain a planar mesh by using a motion of the moving body (a motion of the camera sensor) and using a default mesh with vertices corresponding to positions where image pixels along the scan line of the camera sensor are back-projected onto a target plane. The planar mesh may include vertices positioned on the target plane. The target plane may correspond to, for example, the ground (e.g., a road surface), but is not limited thereto. As described with reference to FIG. 1, the image data may be distorted (relative to the true scene) due to the movement of the camera sensor when capturing the image data. The planar mesh may be adjusted according to the motion of the moving body to compensate for the distortion. For example, the planar mesh may be understood as modeling an arrangement of physical points represented by the image pixels of the image data based on the position of the camera sensor at a reference time point (when the image data began being captured).

The previously-mentioned default mesh may be a planar mesh which does not reflect motion of the moving body (e.g., models a stationary state of the moving body). A "planar mesh" is a mesh in which the vertices are co-planar with respect to each other (some minor deviation is tolerated). The default mesh may have vertices obtained by back-projecting vertices (e.g., image vertices) set on an image plane to the target plane. A mesh configured with the image vertices may be referred to as an image mesh. The image mesh may be a mesh having vertices arranged in correspondence with positions of the image pixels and corresponding to the sensing elements arranged along same scan lines of the camera sensor. The default mesh may be obtained by using camera parameters to back-project the image mesh (described above) onto the target plane. Since the default mesh models a stationary camera, the motion of the camera (or moving body) may be excluded (or not accounted for) when determining the default mesh. Each of the image vertices of the image mesh may be back-projected onto the target plane (e.g., the ground) based on the position of the camera sensor with respect to the moving body and a view direction (or the light rays) from the image pixel corresponding to the corresponding vertex toward an origin of the camera sensor. The default mesh and image mesh are described with reference to FIGS. 4 and 5.

According to an example, the aforementioned planar mesh may include vertices having positions calibrated according to scan time points based on the motion of the moving body (based on the reference time point). For example, the electronic device may obtain a deformed mesh (the planar mesh) by calibrating (e.g., adjusting/moving/deforming) the vertices of the default mesh based on the motion of the moving body. In some implementations, the vertices are moved within the plane of the planar mesh. The electronic device may determine the planar mesh by adjusting the positions of the vertices in the default mesh based on the motion of the moving body at the scan time points of the corresponding scan lines. The planar mesh may be formed by displacing vertices of the default mesh according to the changed motion (e.g., the changed position or posture) of the moving body at the scan time point for scanning the pixel corresponding to each vertex (where the changed motion is compared to motion at the reference time point, i.e., the time of capturing the first scan line). Determination of the planar mesh by deformation of the default mesh is described with reference to FIGS. 7 and 8.

For reference, the image mesh may be in an image coordinate system (e.g., an image space) and the default mesh and planar mesh may be in a world coordinate system. The world coordinate system may be a three-dimensional coordinate system having a point in physical space as an origin, and in some examples, a point in the target plane (e.g., the ground plane) with respect to the moving body (e.g., a vehicle) may be the origin of the world coordinate system. Points in the target plane may be points at which a Z-axis value is 0 in the world coordinate system. That is, the ground/target plane may be the plane defined by x and y axes, where the z axis is perpendicular to the ground/target plane. When the moving body moves, the origin of the world coordinate system correspondingly moves with it (i.e., the world coordinate system is a coordinate system of the moving body). The image coordinate system may be a two-dimensional coordinate system in which a point on the image plane (e.g., a point corresponding to a corner of the image) is set as the origin, one axis (e.g., the horizontal axis) of the image is set as an x axis, and the other axis (e.g., the vertical axis) is set as a y axis.

In operation 230, the electronic device may generate a scene view image from the image data based on the obtained planar mesh. The electronic device may render the scene view image by using the planar mesh as determined based on the motion of the moving body and based on image pixels mapped for each vertex of the planar mesh. The scene view image corresponds to a scene view. The scene view may be a view from an arbitrary view point toward an area of the target plane that is within the viewing angle of the camera sensor. The scene view may be, for example, a top (overhead) view of a surrounding area of the moving body seen from a view point spaced apart from (e.g., above) the target plane. A field of view (FOV) of the scene view may be arbitrarily set or may be designated by a user. The generation of the scene view image is described with reference to FIGS. 13 to 15.

Figure 3:
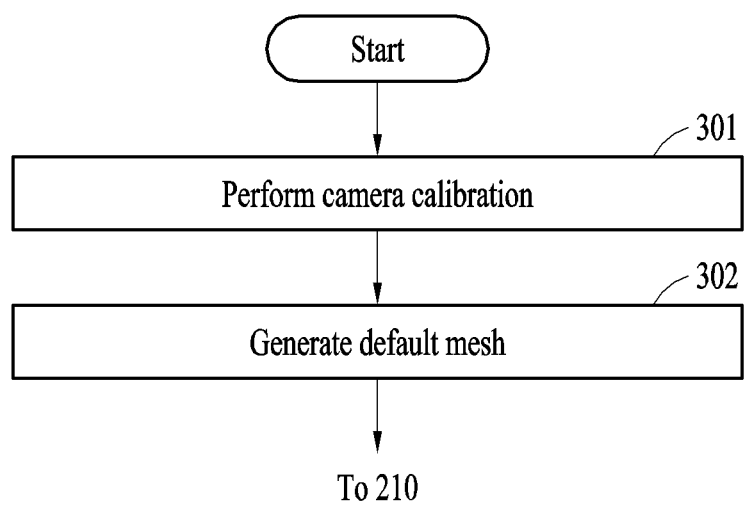
FIG. 3 illustrates an example process, according to one or more example embodiments.

FIG. 3 illustrates an example process for a mesh for a camera sensor, according to one or more example embodiments.

In operation 301, camera calibration may be performed. The camera calibration may be performed at a manufacturing stage of a camera or electronic device. For example, intrinsic calibration may be performed at the manufacturing stage of the camera. Extrinsic calibration may be performed in a manufacturing operation of the vehicle after the camera is mounted on the moving body (e.g., the vehicle). Camera parameters of the camera sensor may be obtained through the camera calibration. The camera parameters may include camera intrinsic parameters and camera extrinsic parameters. The camera intrinsic parameters may include a focal length and a principal point of the camera sensor. The camera extrinsic parameter may be a transformation relationship between the camera coordinate system and the world coordinate system, and may represent, for example, rotation and/or translation between the two coordinate systems. The camera coordinate system may be a three-dimensional coordinate system in which a focus of the camera or a center of a lens is the origin and an optical axis of the camera is a z axis. When the camera parameters described above are used, the position of a physical point (e.g., a point on the target plane) in the world coordinate system may be transformed to a position on the image plane based on the image coordinate system. On the other hand, when the camera parameters are used, the position of an image pixel on the image plane may be transformed to a position in the world coordinate system.

In operation 302, the default mesh may be generated. For example, when the camera parameters of operation 301 are given/known, the electronic device may calculate the default mesh. In another example, the default mesh may be calculated by a separate device. The default mesh may be constructed by back-projecting image vertices in the image pixel of the image plane onto the target plane, as described with reference to FIGS. 4 and 5.

Figure 4:
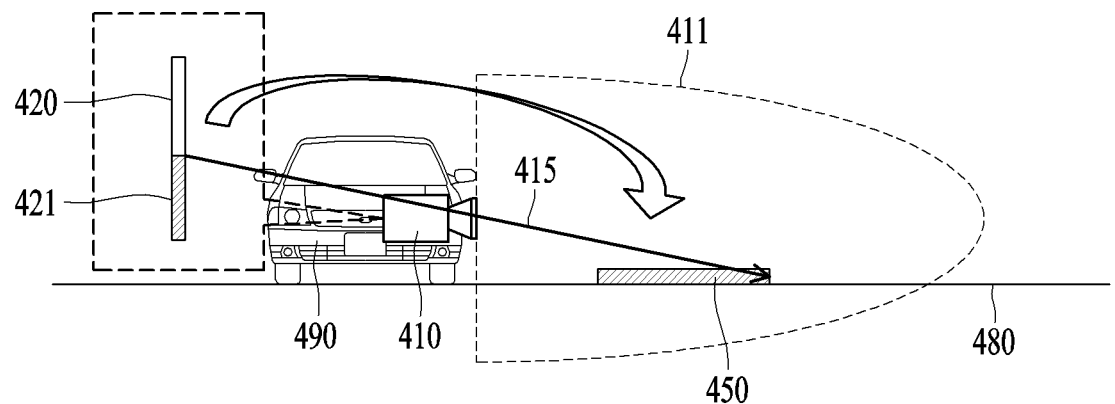
FIG. 4 illustrates an example of use of a sensor, according to one or more example embodiments.
Figure 5:
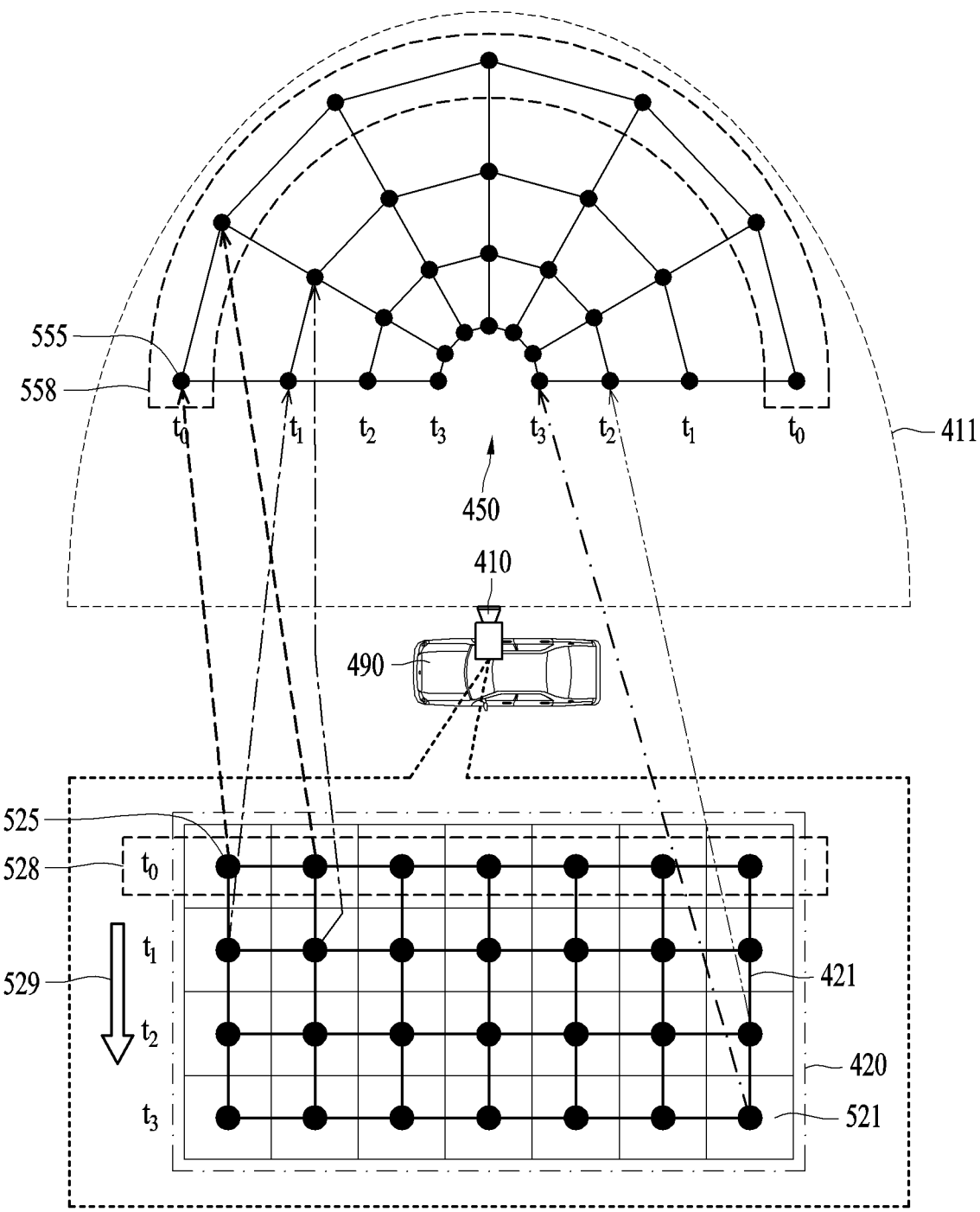
FIG. 5 illustrates an example mesh for a camera sensor, according to one or more example embodiments.

FIG. 4 is a front view of a moving body (e.g., a vehicle) provided with a camera sensor, and FIG. 5 is a top view thereof. In FIGS. 4 and 5, the moving body may be stationary.

At least a portion of an FOV 411 of the camera sensor according to an example may intersect a target plane 480. For example, a camera sensor 410 may include an ultra wide-angle lens or a fisheye lens. FIG. 4 illustrates an example in which an angle of the FOV 411 of the camera sensor 410 is 180 degrees (e.g., at side to side, or hemispherical). The target plane 480 may be, for example, the ground (e.g., with coordinates that model the ground in the world coordinate system). In addition, the electronic device may be mounted on/in a vehicle, and the camera sensor 410 may be positioned on at least one of a front surface, rear surface, or side surface of the vehicle. Herein, an example in which the camera sensor 410 is positioned on the side portion of the vehicle is mainly described, but implementations are not limited thereto.

As described above, since the target plane 480 is included in the FOV 411 of the camera sensor 410, at least a partial region of captured image data may correspond to the target plane 480 (i.e., the captured image data may include image data representing some of the target plane 480). According to an example, image vertices of the image mesh 421 may be set to image pixels within a region corresponding to the target plane 480 in the image data. Referring to FIG. 4, the image vertices may be back-projected onto the target plane 480. For example, the electronic device may back-project the image vertices onto the target plane 480 as shown in Equation 1.

$$p_{ground} = \begin{bmatrix} X_p \\ Y_p \\ 0 \end{bmatrix} = \begin{bmatrix} X_C \\ Y_C \\ Z_C \end{bmatrix} - \frac{Z_C}{R_Z} \begin{bmatrix} R_X \\ R_Y \\ R_Z \end{bmatrix} \quad \text{Equation 1}$$

In Equation 1, $[X_C \ Y_C \ Z_C]^T$ represents the position of the camera sensor 410. Here, the camera position may be represented as coordinates based on the world coordinate system. $[R_X \ R_Y \ R_Z]^T$ represents a direction (e.g., a view direction 415 or light ray direction) from the image pixel (e.g., the image vertex of the image mesh 421) toward the origin of the camera sensor 410. For example, the view direction 415 corresponding to the image pixel described above may be determined based on the camera intrinsic parameters and camera extrinsic parameters. For example, a light ray vector representing the view direction 415 from a camera's viewpoint (e.g., direction $[R_{CX} \ R_{CY} \ R_{CZ}]^T$) may be in the camera coordinate system and may be determined based on the camera intrinsic parameters. Such a vector ($[R_X \ R_Y \ R_Z]^T$) representing the view direction 415 may be in the world coordinate system and may be determined based on the light ray vector (e.g., $[R_{CX} \ R_{CY} \ R_{CZ}]^T$) and on a rotation matrix (e.g., R) in the camera extrinsic parameters. That is, a vector representing the view direction 415 may be satisfied by $[R_X \ R_Y \ R_Z]^T = R^T [R_{CX} \ R_{CY} \ R_{CZ}]^T$. T indicates the transpose operation. In Equation 1, $p_{ground}$ represents a point of the target plane 480 (e.g., the plane where Z=0 in the world coordinate system) where a light ray corresponding to the view direction 415 $[R_X \ R_Y \ R_Z]^T$ starting from the camera position $[X_C \ Y_C \ Z_C]^T$ arrives/intersects. This is because a value of Z axis is 0 since $(Z_C/R_Z)[R_X \ R_Y \ R_Z]^T$ is $[R_X/R_Z \ R_Y/R_Z \ Z_C]^T$. $p_{ground}$ may be calculated as a point $[X_p \ Y_p \ 0]^T$ on the target plane 480. $X_p$ and $Y_p$ respectively represent the X-axis position and Y-axis position of the vertex of the default mesh 450 on the target plane 480.

The back-projection according to Equation 1 is applied to the image vertices of the image mesh 421 to obtain the vertices of the default mesh 450. Therefore, each of the vertices of the default mesh 450 may be disposed (i) at a position back-projected onto the target plane 480 (ii) along a direction from the sensing element corresponding to the image pixel mapped to the corresponding vertex toward the origin of the camera sensor 410, and (iii) based on the position of the camera sensor 410 with respect to a moving body 490.

FIG. 5 illustrates image vertices of the image mesh 421 and vertices of the default mesh 450. According to an example, for image pixels 521 mapped to respective vertices adjacent to each other in the planar mesh, such image pixels 521 may be positioned along the same scan line. For example, image pixels mapped to respective vertices may be positioned along the same scan line as at least one of the image pixels 521 mapped to neighboring vertices. That is to say, image pixels of a given scan line may map to vertices along a same curve line in the default mesh 450. As described above with reference to FIG. 4, the vertices included in the default mesh may be mapped to image pixels belonging to a portion of the FOV 411 of the camera sensor 410 overlapping the target plane 480. Among the image pixels 521 mapped to vertices of the default mesh 450, the image pixels 521 along a same scan line may be spaced apart at regular intervals. The image mesh 421 may include vertices set for the pixels (e.g., the image pixels 521) of the image plane 420 so that a polygon is formed of neighboring vertices.

FIG. 5 shows an example with a total of 7×4=28 image pixels 521 including 7 horizontal axes (columns) and 4 vertical axes (rows) in the image plane 420. A space (square) represents an image pixel and an image vertex is set as a central position of the image pixel. FIG. 5 shows the position of the image vertex as a circle (dot), and a total of 28 image vertices (equal to the number of the image pixels 521) are set in the example. The image mesh 421 may be configured for neighboring image vertices to form quadrangles by connecting the 28 image vertices with horizontal and vertical edges. As shown in FIG. 5, the example in which the image vertices are set for respective image pixels is mainly described herein, but implementations are not limited thereto. An example in which the image vertices are set to be spaced apart at an interval of two image pixels is described with reference to FIG. 15.

The camera sensor 410 may change the selection of a scan line (iterate over the rows/columns of sensing elements) from a reference time point $t_0$ and make such successive selections in a scan direction 529 (e.g., a downward direction). For example, the camera sensor 410 may sequentially select scan lines in the order of the reference time point $t_0$, a time point $t_1$, a time point $t_2$, and a time point $t_3$. The camera sensor 410 may determine/capture pixel values of the image pixels 521 in the selected scan line by obtaining sensing values of the sensing elements corresponding to the current scan line. The image pixels 521 corresponding to a scan line of a first row in the image mesh 421 are obtained at the reference time point $t_0$. The image pixels 521 corresponding to a scan line of a second row are obtained at a subsequent time point $t_1$. Similarly, the image pixels 521 corresponding to scan lines of third and fourth rows are obtained at time points $t_2$ and $t_3$, respectively. The reference time point $t_0$ may be the earliest time point and the time point $t_3$ may be the last time point.

Position indices according to the arrangement in the image plane 420 may be mapped to the image pixels for which the image vertices are set. Each position index may have a two-dimensional integer index with respect to the origin. For example, an image vertex 525 on a leftmost side on an uppermost end of the image plane 420 is the origin and the position index thereof is (0,0). The position index of a right vertex of the image vertex 525 is (1,0). Similarly, the position indices of the remaining image vertices in the first row are (2,0), (3,0), (4,0), (5,0), and (6,0). The position index of a vertex below the image vertex 525 is (0,1). The position indices of the remaining image vertices are mapped in a similar manner. A vertex, onto which an arbitrary image vertex is back-projected, may have the same position index as the corresponding image vertex. For example, the position index of a vertex 555, onto which the image vertex 525 is back-projected, may also be (0,0) in the default mesh 450. FIG. 5 also shows mapping relationships between the image vertices having the position index (0,1), position index (1,0), position index (1,1), position index (6,2), and position index (6,3) and the vertices of the default mesh 450, for reference. For example, the position index may be used to reconstruct the scene view image as described with reference to FIGS. 14 and 15.

The vertices of the default mesh 450 may be grouped/arranged based on the scan lines. For example, the mesh vertices, onto which the image vertices in a same scan line in the image mesh 421 are back-projected, may be classified into a same group. For example, the image vertices in a scan line 528 corresponding to the reference time point $t_0$ may be in the same group 558 (or line/sequence) of vertices. For example, the vertices belonging to the group 558 are mapped to the image pixels 521 scanned at the same time point (i.e., the image pixels of scan line 528). As described below, vertices belonging to a same group of vertices may each be calibrated by the same displacement. That is different displacements may be applied to respective vertex groups.

For reference, according to a comparative example, a grid-type mesh may be set in the world coordinate system. Some vertices of the grid-type mesh of this comparative example, if projected to image positions on the image plane 420, may project to image positions that are not related to the corresponding scan line of the camera sensor 410 due to an optical system of the lens. This may make it difficult or impossible to group the vertices into groups that correspond to the scan lines. In contrast, vertices of a planar mesh according to some implementations are essentially obtained by back-projecting image vertices aligned along the same scan line in the camera sensor 410 to obtain the mesh vertices, and thus the vertices of the planar/default mesh may be grouped by each scan line. Since the vertices of the default mesh 450 are grouped in units corresponding to respective scan lines, the vertices may also be calibrated in units of scan lines. That is, a calibration (e.g., for motion compensation) that corresponds to a given scan line (and a given time point) can be applied to all of the mesh vertices in the mesh vertex group corresponding to that given scan line. The electronic device according to an example may thus obtain a motion-calibrated planar mesh by applying motion information (e.g., speeds or speed differences) of the moving body 490 at the scan time points to the respective vertices (e.g., groups) corresponding to of the scan lines.

Figure 6:
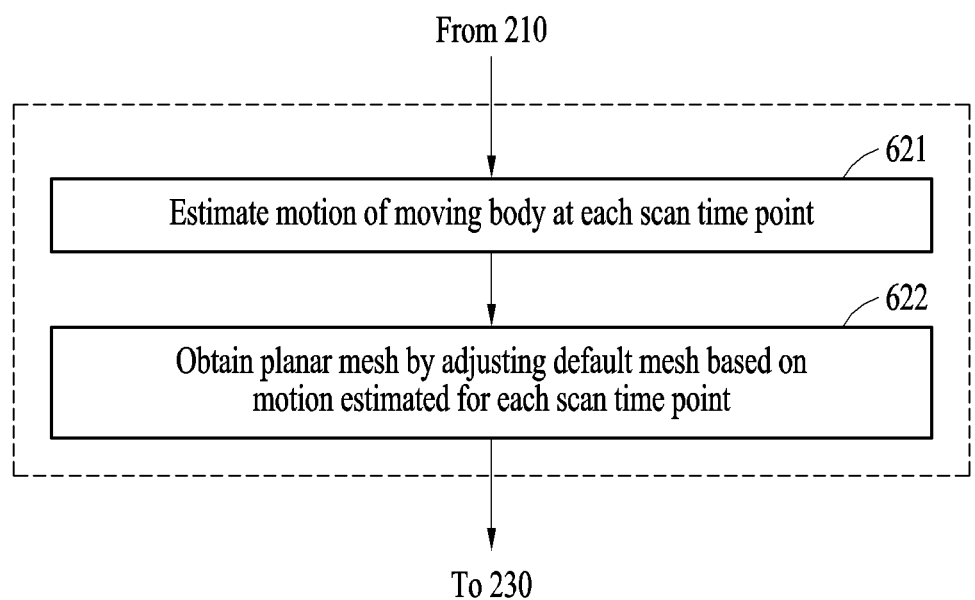
FIG. 6 illustrates an example process of adjusting a planar mesh according to motion of a moving body, according to one or more example embodiments.
Figure 7:
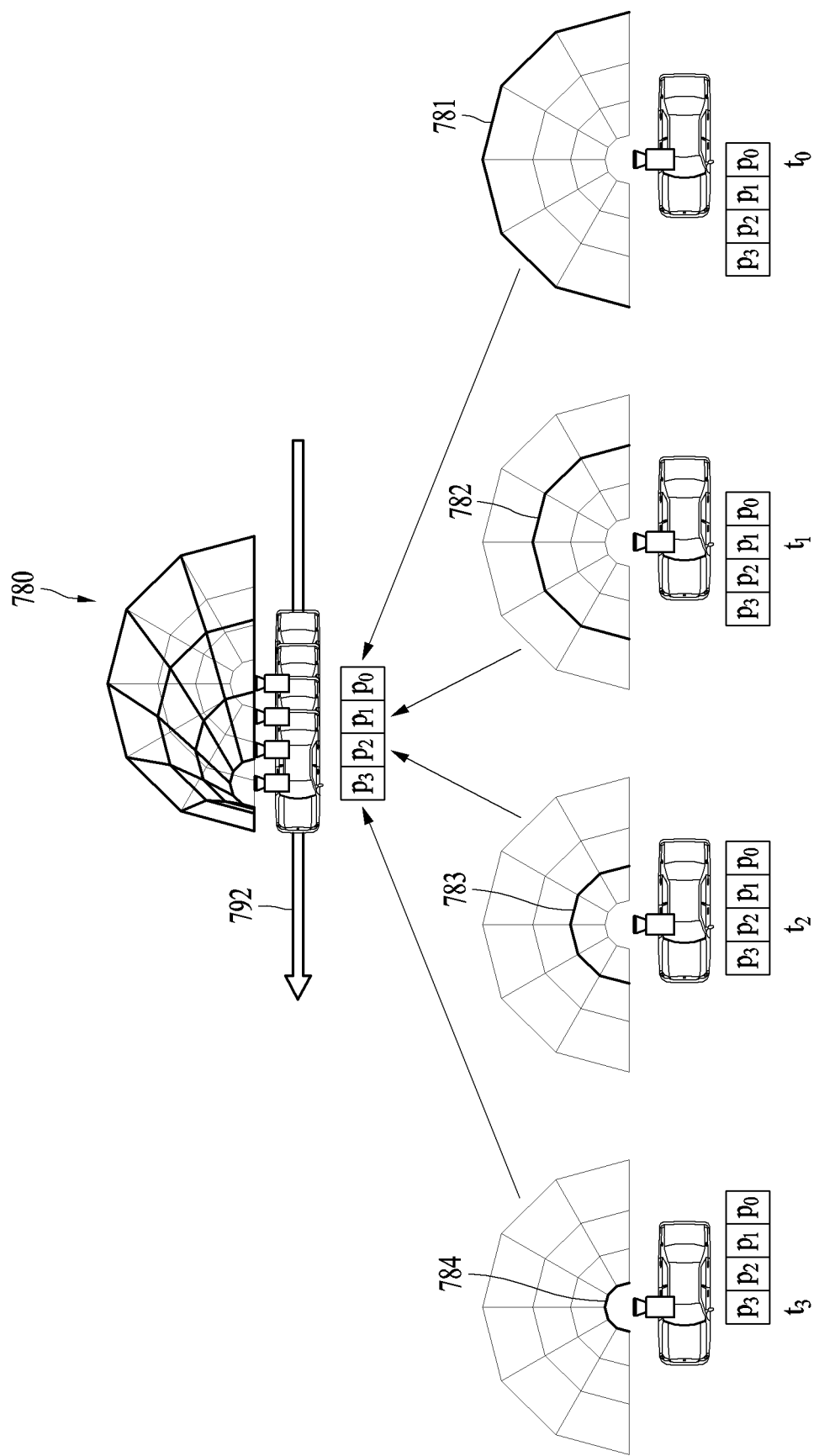
FIG. 7 illustrates an example of mesh adjustment, according to one or more example embodiments.
Figure 8:
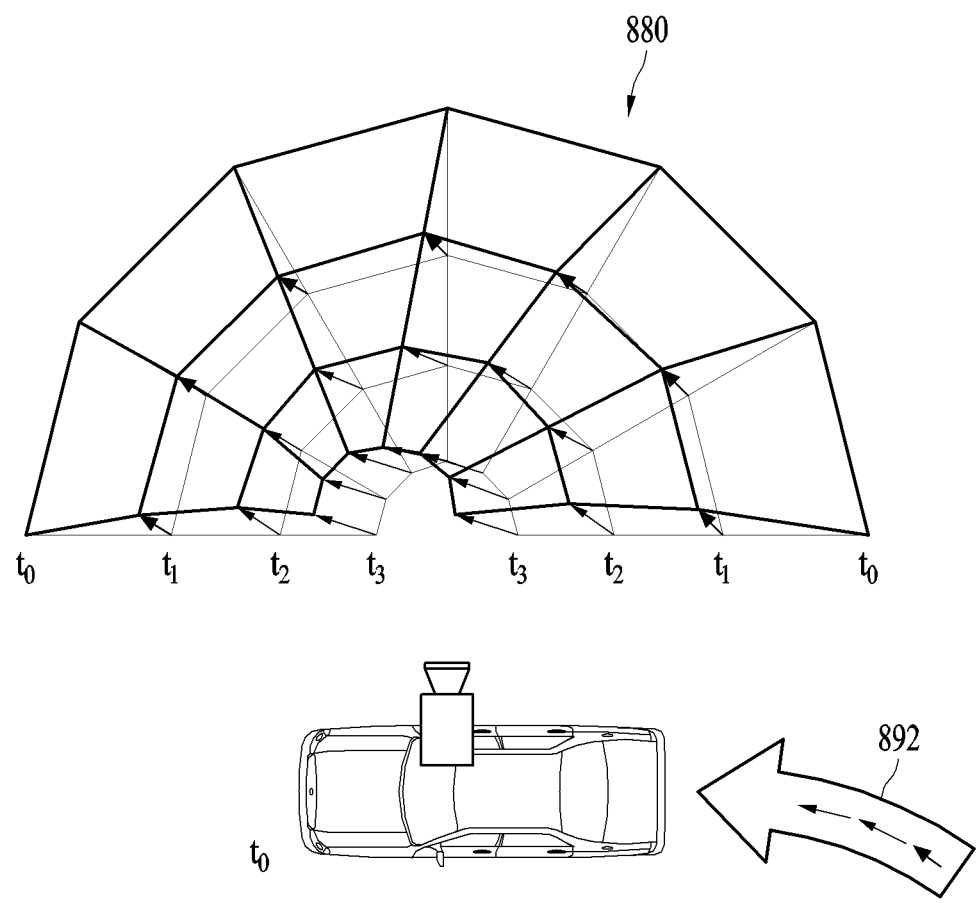
FIG. 8 illustrates an example of mesh adjustment, according to one or more example embodiments.

FIGS. 6 to 8 illustrate an example of a planar mesh adjusted according to motion of a moving body, according to one or more example embodiments.

In operation 621, the electronic device may estimate motions of a moving body for respective scan time points. For example, when the moving body on which the electronic device is mounted (incorporated, etc.) is a vehicle, the electronic device may obtain estimates of motions (including movement and/or rotation of the vehicle) based on various methods, for example, dead reckoning using a wheel speed and a steering wheel angle, global navigation satellite system (GNSS) information, inertial measurement unit (IMU) information, and/or simultaneous localization and mapping (SLAM). The electronic device may calculate a speed and yaw rate of the moving body (e.g., the vehicle) at each scan time point. A camera sensor may be fixed to the moving body and such motion information of the moving body may naturally be the same motion information of the camera sensor (some minor deviation may exist depending on the location of the camera relative to the moving body).

In operation 622, the electronic device may obtain planar mesh 780 or planar mesh 880 by adjusting a corresponding default mesh based on the motions estimated for the respective scan time points. FIG. 7 shows the example planar mesh 780, which corresponds to the moving body moving along a straight line. FIG. 8 shows the example planar mesh 880, which corresponds to the moving body moving along a curve; planar mesh 780 and planar mesh 880 are examples corresponding to different conditions of capturing different respective images by the camera sensor. For understanding, planar mesh 780 and planar mesh 880 are shown with thicker lines than their corresponding default meshes, which are shown with lighter lines; each example planar mesh and its corresponding example default mesh may be in a same plane (co-planar), although in some implementations they may not be strictly co-planar. For example, a processor of the electronic device may obtain the planar meshes 780 or planar mesh 880 by adjusting vertices in a group corresponding to a given scan line at a corresponding given scan time point in the default mesh based on the motion of the moving body at the given scan time point. For example, the electronic device may obtain the planar meshes 780 or planar mesh 880 by fixing vertices at the reference time point in the default mesh and then adjusting the remaining vertices based on the motions of the moving body.

In some implementations, the electronic device may calculate a motion difference (compared to the reference time) for each scan time point by using the motions of the moving body at each respective scan time point. The motion difference may include a position difference and posture difference of the moving body. Referring to FIG. 7, when the moving body moves along a moving direction 792, the moving body may be at positions $p_0$, $p_1$, $p_2$, and $p_3$ at time points $t_0$, $t_1$, $t_2$, and $t_3$, respectively. At the first position $p_0$, the camera sensor may capture image information (image pixels) of vertices belonging to a first group (e.g., a first vertex group 781) in the default mesh, and thereby determines image pixels in a scan line at the first time point $t_0$. In other words, the image pixels in a first scan line may have pixel values based on light received from physical points corresponding to the first vertex group 781. At the second position $p_1$, the camera sensor may determine image pixels in a scan line at the second time point $t_1$ based on image information of a second vertex group 782. Similarly, at the remaining positions $p_2$ and $p_3$ the camera sensor may also determine image pixels in scan lines at the time points $t_2$ and $t_3$ based on image information of a third vertex group 783 and a fourth vertex group 784. When the first time point $t_0$ is the reference time point, the pieces of the image information at the second time point $t_1$, third time point $t_2$, and fourth time point $t_3$ may be captured in the second vertex group 782, the third vertex group 783, and the fourth vertex group 784, respectively, which are moved by the motion differences at the respective time points. Accordingly, the electronic device may calibrate (adjust) the default mesh by applying the motion differences between the motion of the reference time point and the motions of the scan time points in the respective vertex groups. FIG. 7 shows the planar mesh 780 generated by calibrating (motion-compensating) the default mesh.

According to an example, the electronic device may calculate a motion difference between the reference time point and another time point by using motion at the other time point (such a motion difference may be calculated for each of the non-reference time points). For example, the electronic device may calculate transformation matrices $T_{t_0 t_1}$, $T_{t_0 t_2}$, and $T_{t_0 t_3}$ representing the respective motion differences at the time points $t_1$, $t_2$, and $t_3$ (where the differences are relative to the position and posture of the moving body at the first time point $t_0$). Each motion difference may be information indicating relative motion at the corresponding scan time point as compared to motion at the reference time point; each motion difference may include a rotation and translation of the moving body for the corresponding time point. For example, the motion difference of the moving body may be implemented as a rotation-scale-translation (RST) matrix.

For example, the electronic device may calculate a transformation matrix $T_{t_0 t_k}$ representing the motion difference from the first time point $t_0$ to a k-th time point $t_k$. The transformation matrix $T_{t_0 t_k}$ may also be a matrix representing a rigid body transformation corresponding to the motion difference of the moving body. The electronic device may apply the transformation matrix $T_{t_0 t_k}$ to the vertex group corresponding to the k-th time point $t_k$ as in Equation 2.

$$p_{ground}' = T_{t_0 t_k} p_{ground} \quad \text{Equation 2}$$

In Equation 2, $p_{ground}$ represents a vertex belonging to the k-th vertex group corresponding to the k-th time point $t_k$. The electronic device may move vertices belonging to the k-th vertex group according to their corresponding motion difference by applying Equation 2 to those vertices. The electronic device may obtain the planar mesh 780 obtained by calibrating the default mesh by merging or combining the vertex groups moved by the motion difference for each scan time point. In other words, the planar mesh 780 may be obtained by moving the vertex groups of the default mesh according to their respective motion differences.

As noted above, FIG. 7 shows an example in which the moving body moves along a straight line, and FIG. 8 shows an example in which the moving body moves along a curve 892. As shown in FIG. 8, even in a case of movement along a curve such as curve 892, the electronic device may determine the planar mesh 880 by moving each vertex group by the motion difference at the individual scan time point compared to the reference time point. In other words curvilinear motion during an image capture may be compensated for.

The electronic device may obtain the planar meshes 780 and 880 by moving the vertices corresponding to the scan lines of the corresponding scan time points based on vertex displacements corresponding to differences between the motion of the moving body at the scan time points and the motion at the reference time point. Mesh vertex movement according to a motion difference for a given time point may be obtained by applying the transformation matrix corresponding to the motion difference according to Equation 2 to the vertices corresponding to the given scan time point. The electronic device may apply the same transformation matrix to each of the vertices belonging to the same vertex group of the given time point.

For example, as shown in FIG. 7, when the moving body moves along a straight line, the electronic device may obtain the final motion-adjusted planar mesh 780 by moving vertices corresponding to a scan line at a scan time point subsequent to the reference time point in the default mesh in a direction corresponding to the straight line movement of the moving body. In the example shown in FIG. 7, the reference time point is the time point $t_0$ at which the scan starts, and thus, the electronic device may move vertex groups corresponding to the remaining subsequent time points $t_1$, $t_2$, and $t_3$ in the same direction as the movement of the moving body. The electronic device may obtain the planar mesh 780 by moving vertices at a same scan time point in the default mesh by a same distance in a same direction.

In the example shown in FIG. 8, when the movement of the moving body includes a rotation component, the vertices of a same scan time point in the default mesh may be moved with displacements according to a rigid body transformation. The electronic device may obtain the final adjusted/calibrated planar mesh 880 by moving vertices of a same scan time point in the default mesh by using a transformation matrix that is based on the rigid body transformation corresponding to the motion of the moving body for that scan time point. When the moving body rotates, a vertex distant from a center (e.g., a turning center) of rotation of the moving body may move farther and rotate more than a vertex close to the center point, even if they belong to the same vertex group. For example, when the moving body rotates, a displacement applied to a point distant from a rotation center point of the moving body may be greater than a displacement applied to a point close to the rotation center point even if within the same vertex group.

Figure 9:
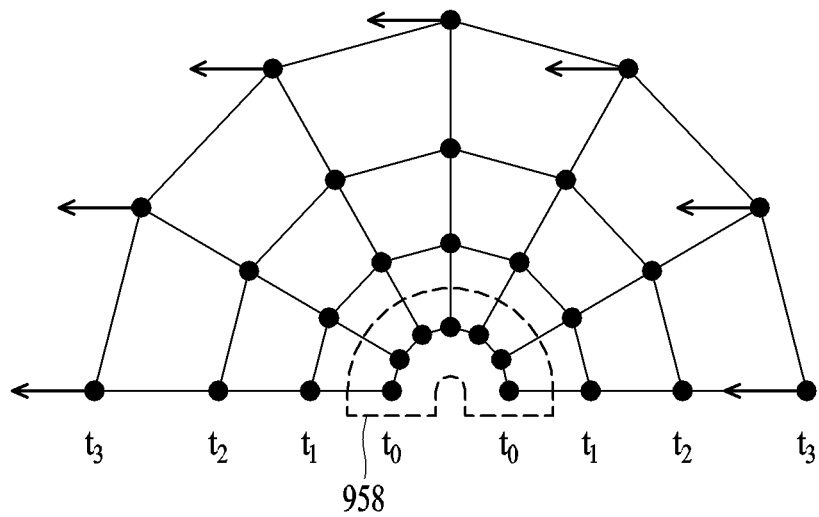
FIG. 9 illustrates an example of applying a motion of a moving body to a default mesh for scan lines, according to one or more example embodiments.
Figure 9:
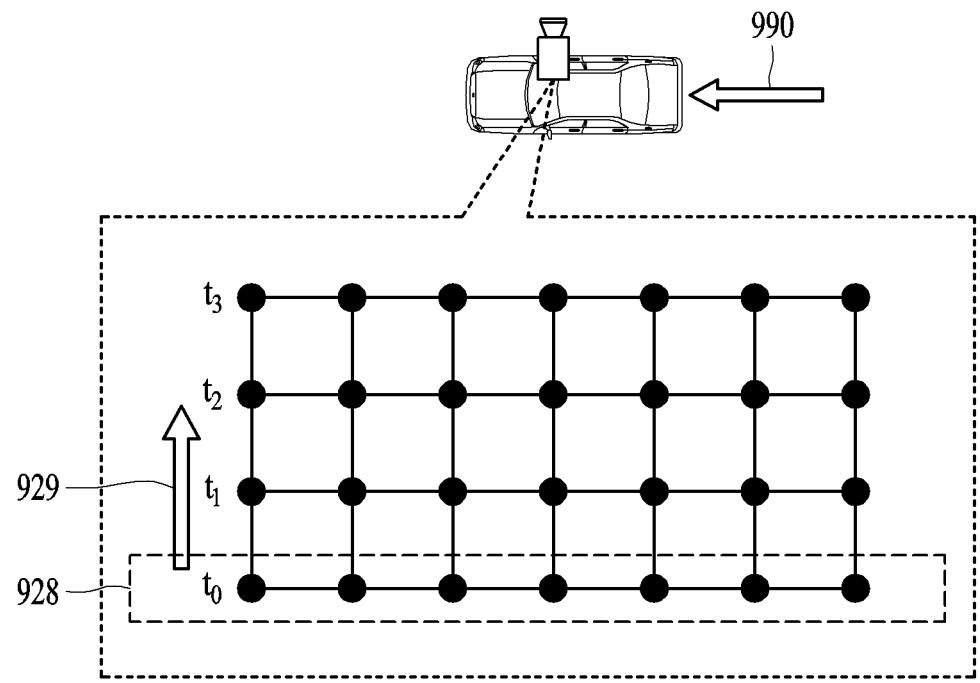
Figure 10:
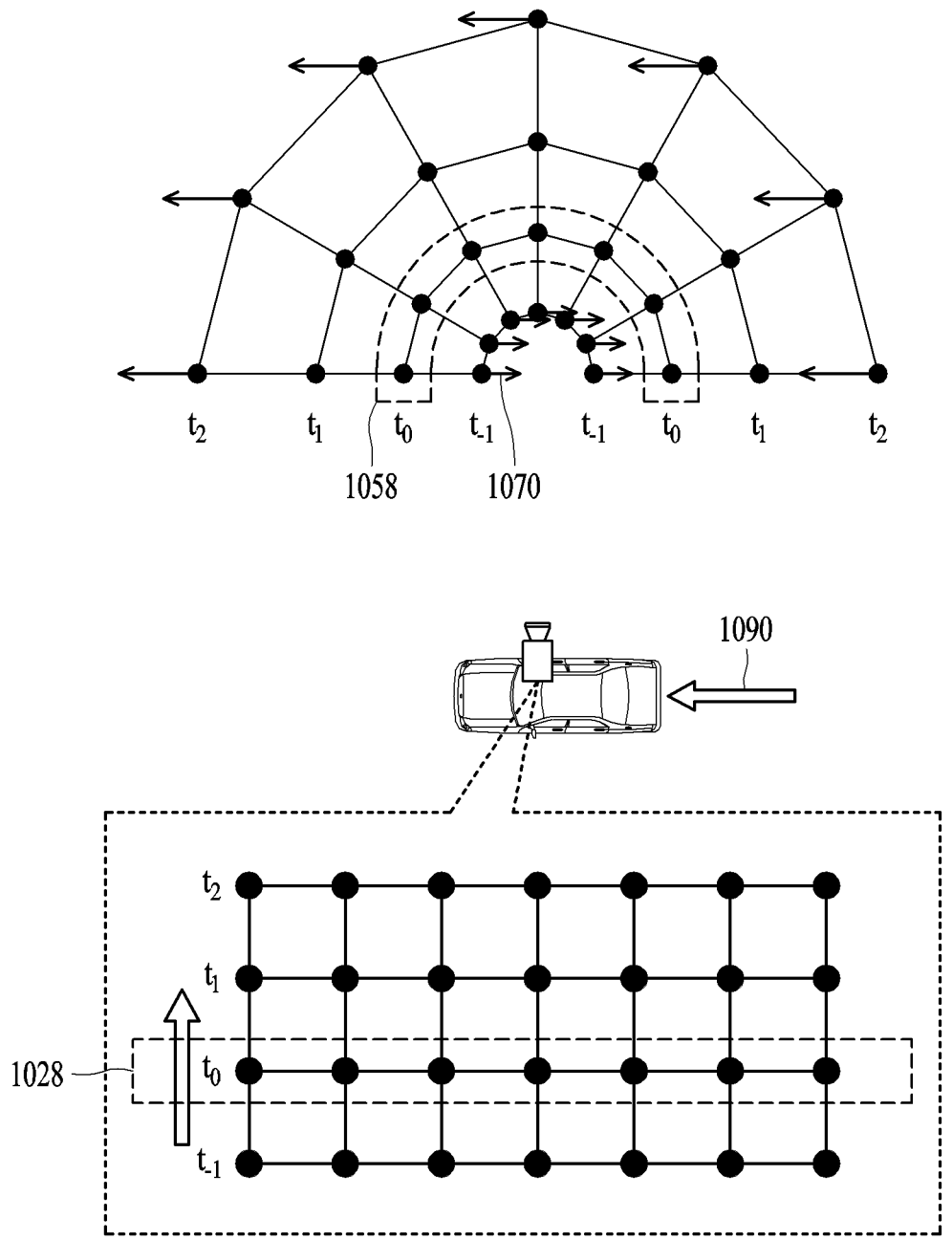
FIG. 10 illustrates an example of applying a motion of a moving body to a default mesh for scan lines, according to one or more example embodiments.
Figure 11:
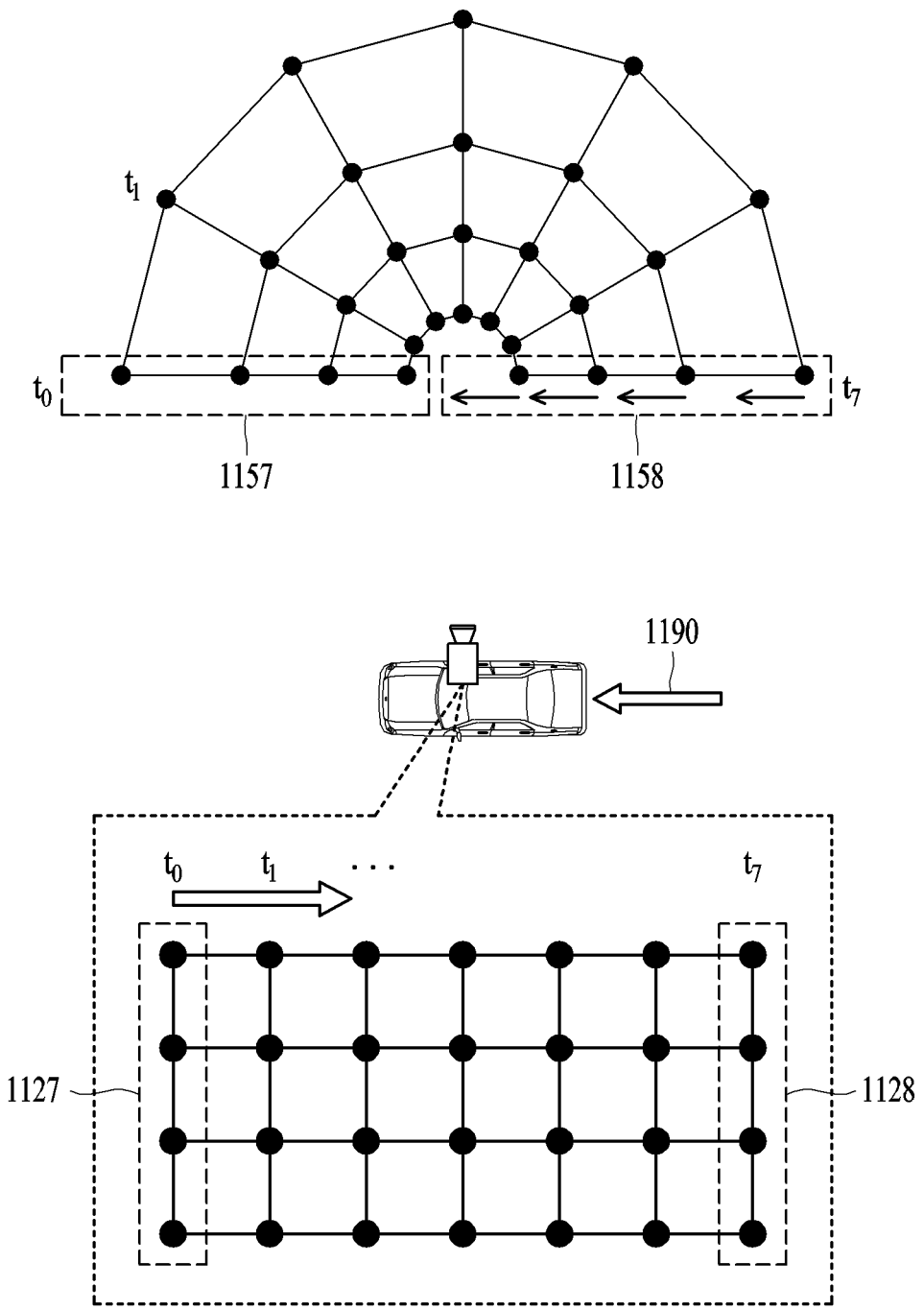
FIG. 11 illustrates an example of applying a motion of a moving body to a default mesh for scan lines, according to one or more example embodiments.

FIGS. 9 to 11 illustrate an example of applying motion of a moving body to a default mesh for each scan line of a captured image, according to one or more example embodiments.

For discussion, FIGS. 9 to 11 show a default mesh and an example displacement amount to be applied to the corresponding default mesh for brief description; a final planar mesh obtained by applying all displacements to the default mesh is not shown.

FIG. 9 shows an example in which the camera sensor starts scanning from image vertices in a lowest scan line 928 among scan lines of an image mesh. In this case, a scan direction 929 is from the bottom to the top on an image plane. The image vertices in the lowest scan line 928 may correspond to an innermost vertex group 958 of the default mesh. In contrast to the default meshes shown in FIGS. 7 and 8, the vertex group corresponding to the reference time point $t_0$ in FIG. 9 is the innermost vertex group 958. The electronic device may calibrate the remaining vertex groups with respect to the innermost vertex group 958 based on the motion differences at the other scan time points according to movement 990 of the moving body. FIG. 9 shows an example of a displacement amount to be applied to an outermost vertex group (e.g., a vertex group corresponding to the time point $t_3$) of the default mesh. The default mesh shown in FIG. 9 is as before the displacement amount is applied. The electronic device may obtain a calibrated planar mesh by applying the displacement amount shown in FIG. 9 to the outermost vertex group.

FIG. 10 illustrates an example in which a scan line 1028 in the middle of scan lines of an image mesh is set as the reference time point $t_0$. The electronic device may adjust the remaining vertex groups with respect to a vertex group 1058 corresponding to the scan line 1028 in the middle. As described with reference to FIGS. 7 and 8, the vertices corresponding to scan lines of scan points subsequent to the reference time point in the default mesh may be moved in the same direction as a movement 1090 of the moving body. On the other hand, vertices corresponding to a scan line at a scan time point before the reference time point in the default mesh may move in an opposite direction 1070 to the movement 1090 of the moving body. In the example shown in FIG. 10, the electronic device may move vertex groups corresponding to subsequent time points $t_1$ and $t_2$ in the same direction as the movement 1090 of the moving body and move vertex groups corresponding to a previous time point $t_{-1}$ in the opposite direction 1070. FIG. 10 shows an example of a displacement amount to be applied to an innermost vertex group (e.g., a vertex group corresponding to the time point $t_{-1}$) and an outermost vertex group (e.g., a vertex group corresponding to the time point $t_2$) in the default mesh. The default mesh shown in FIG. 10 may indicate a mesh before the displacement amount is applied. As shown in FIG. 10, displacement directions to be applied to the innermost vertex group (e.g., the vertex group corresponding to the time point $t_{-1}$) and the outermost vertex group (e.g., the vertex group corresponding to the time point $t_2$) may be opposite to each other.

FIG. 11 shows an example in which the scan line is a vertical line. The vertices are grouped along arcs in the default mesh having a shape similar to a sector in FIGS. 7 and 8, but the vertices may be grouped along straight lines in FIG. 11. The camera sensor may sequentially scan from a scan line 1127 on one side to a scan line 1128 on the other side in units of vertical lines. The electronic device may adjust remaining vertex groups 1158 with respect to a vertex group 1157 corresponding to the scan line 1127. According to a movement 1190 of the moving body, vertices belonging to the vertex group 1157 may be moved by a motion difference at the corresponding time point compared to the reference time point as described above. FIG. 11 shows an example of a displacement amount to be applied to a vertex group corresponding to a time point $t_7$ of the default mesh. The default mesh shown in FIG. 11 may indicate a mesh before the displacement amount is applied.

Figure 12:
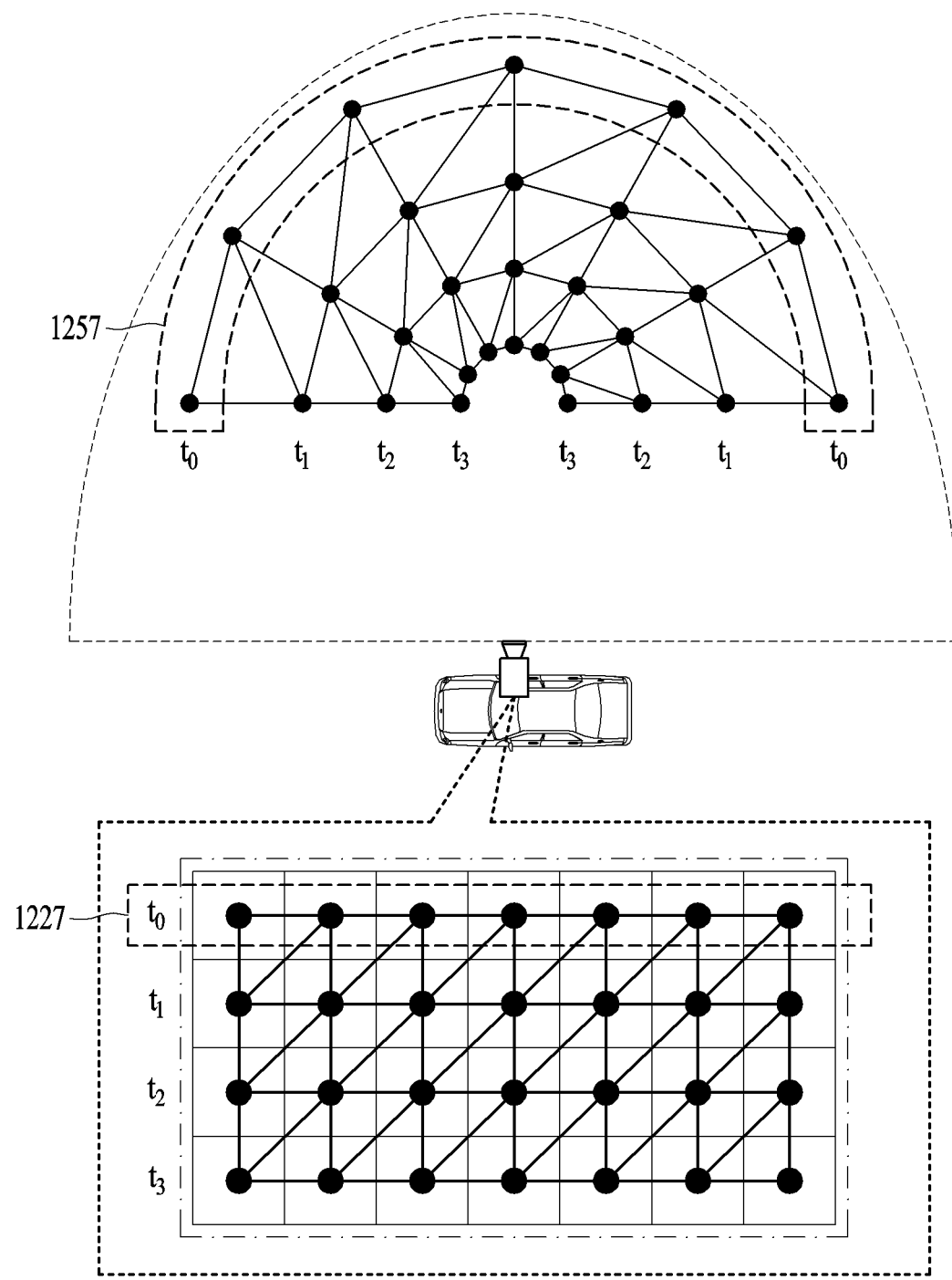
FIG. 12 illustrates another example of a mesh, according to one or more example embodiments.

FIG. 12 illustrates another example of a mesh.

Whereas FIGS. 7 and 8 illustrate an example in which adjacent image pixels form a quadrangle, implementations are not limited thereto. In some implementations, adjacent or neighboring image pixels may form a triangle, a quadrangle, or other type of polygon. Even in this case, the electronic device may adjust remaining vertex groups with respect to a vertex group 1257 corresponding to a scan line 1227 at the reference time point.

The electronic device according to an example may obtain a scene view image in which a rolling shutter distortion is calibrated (compensated for) by rendering the scene view image based on the planar mesh obtained as described above.

Figure 13:
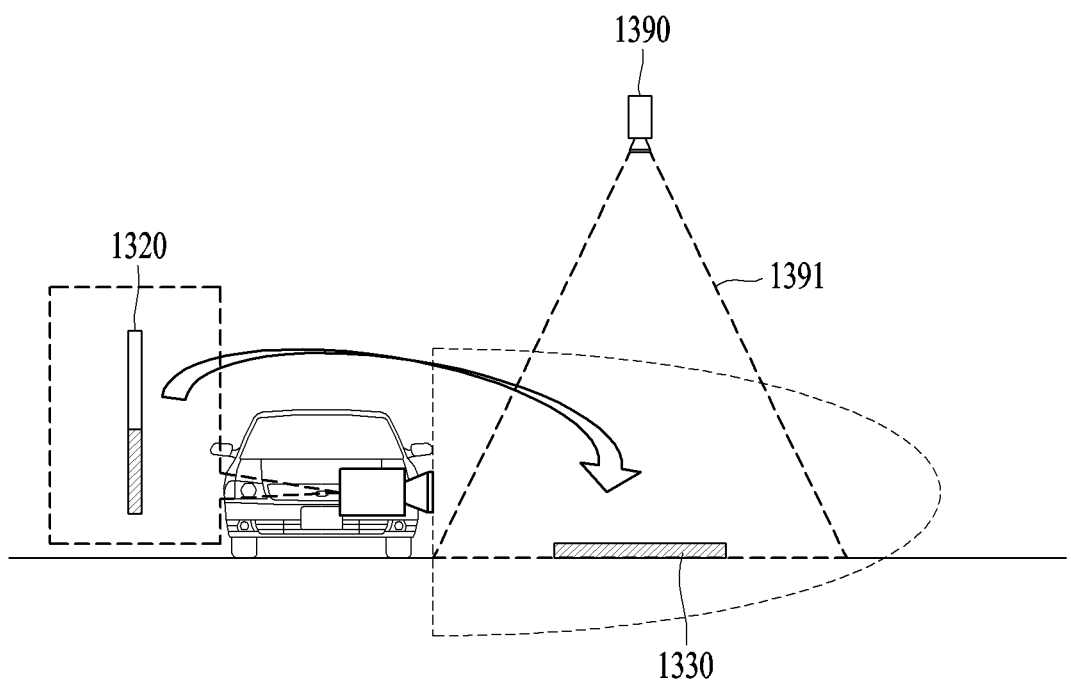
FIG. 13 illustrates an example of generating a scene view image based on a planar mesh, according to one or more example embodiments.
Figure 14:
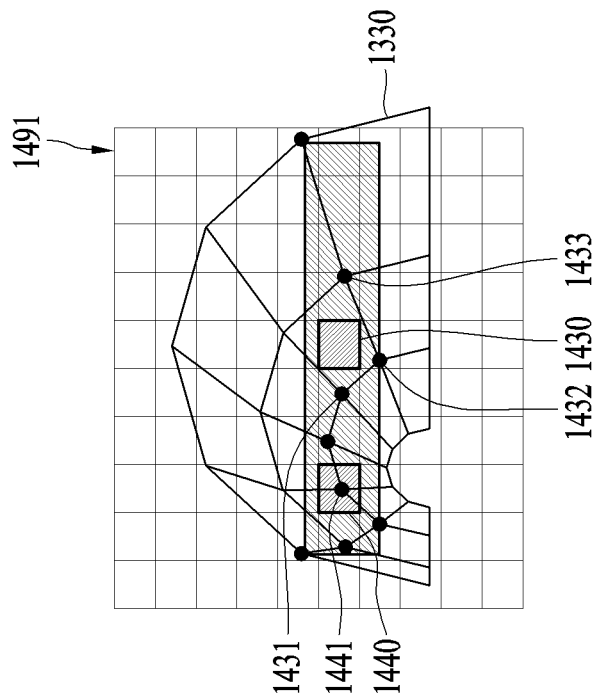
FIG. 14 illustrates an example of generating a scene view image based on a planar mesh, according to one or more example embodiments.
Figure 14:
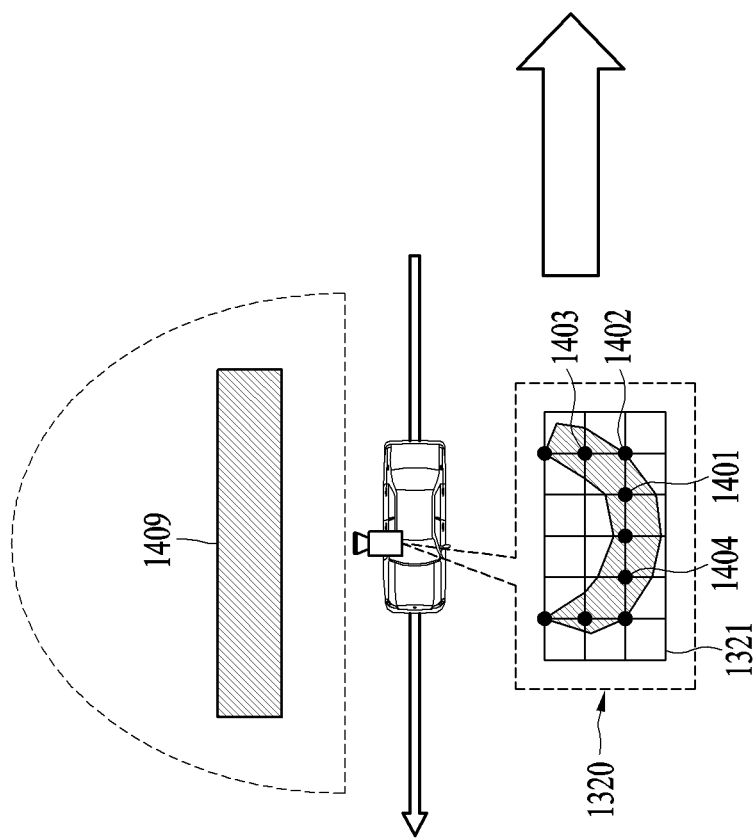
Figure 15:
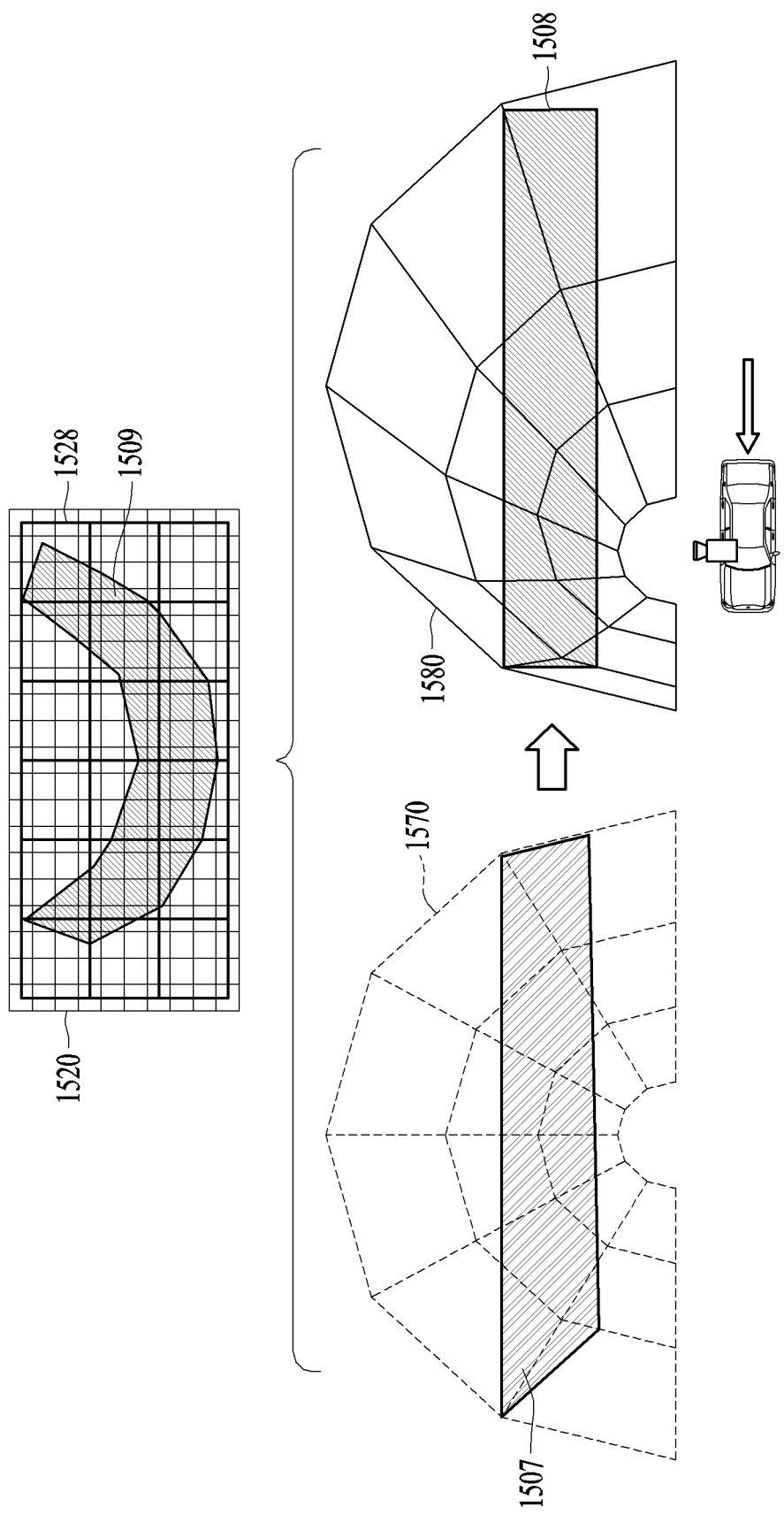
FIG. 15 illustrates an example of generating a scene view image based on a planar mesh, according to one or more example embodiments.

FIGS. 13 to 15 illustrate an example of generating a scene view image based on a planar mesh, according to one or more example embodiments.

FIG. 13 illustrates a front view of a moving body provided with an electronic device for generating a scene view image. FIG. 14 illustrates a top view of the moving body. FIG. 13 shows an example in which a view point is a point spaced apart from a target plane (e.g., the ground) and a scene view is a top view of the target plane seen from the corresponding view point. The scene view image may be an image corresponding to an FOV 1391 of a virtual camera assumed to be positioned at the view point. Referring to FIG. 14, an object 1409 (e.g., a road sign) may be included in an FOV of a camera sensor (e.g., a camera sensor provided to face the side of a vehicle) and the FOV 1391 of the virtual camera while the moving body moves along a straight line. FIGS. 13 and 14 show a shape of the object 1409 shown in image data captured by the camera sensor having a fisheye lens and a planar mesh 1330.

According to an example, the electronic device may generate a scene view image having a view including at least a partial region included in an FOV of a camera sensor in a target plane from the view point. For example, the electronic device may generate, as the scene view image, a top-view image of a region including at least a portion of the planar mesh 1330 on the target plane seen from a direction perpendicular to the target plane. The electronic device may output the top-view image through a display. FIG. 14 shows an example in which the top-view image shows a portion included in a viewing angle of the camera sensor. However, the view point and the scene view are not limited to the above description and may vary according to a design. Also, the electronic device may change at least one of the view point or the scene view (e.g., a view in a direction seen by the virtual camera 1390 from the view point) based on a user input. In some implementations, image data of multiple scene view images, either from a same camera or from different cameras of the moving body, may be combined to provide an image corresponding to an overhead virtual camera.

The electronic device according to an example may render the scene view image from captured image data based on the planar mesh 1330. The electronic device may perform scene view screen rendering by a graphic processing unit (GPU) using vertex coordinates (e.g., coordinates based on the world coordinate system) of the planar mesh and position indices of image pixels. The electronic device may apply a texture based on pixel values of a camera image (e.g., the image data) to the generated planar mesh and perform the rendering. As described below, the texture may be determined based on pixel values of image vertices (or image pixels) of an image mesh corresponding to vertices of the planar mesh. The GPU may perform image warping (e.g., top view screen rendering) by using a mapping relationship between the vertices of the default mesh and the image vertices of the image mesh.

For example, the electronic device may generate the scene view image from the image data based on the mapping relationship between the image pixels of the image data and the vertices of the planar mesh 1330. The electronic device may store the mapping relationship mapping vertices (respectively corresponding to image pixels) to respective image vertices. For example, as described above with reference to FIG. 4, an image pixel and a vertex at a same point may have a same position index. For discussion, FIG. 14 shows only an image mesh 1321 of an image plane 1320 and image vertices of the image mesh 1321 for brief description, and a space showing the image pixels is not shown. Among the image vertices, image vertices that are set to an image pixel of object 1409 are marked with dots. When the camera sensor is a fisheye lens, an object bent according to optical characteristics of the lens may be captured in the image data as shown in FIG. 14. Similarly, among the vertices of the planar mesh 1330, vertices corresponding to the object 1409 are marked with dots.

The electronic device may determine positions of scene pixels 1491 on the target plane based on the scene view described above. The electronic device may back-project the scene pixels 1491 onto the target plane based on camera parameters of the virtual camera 1390 for the scene view image. The electronic device may determine image information corresponding to at least one of the positions of the vertices or the surrounding positions on the target plane, based on the pixel values of the image pixels mapped to the vertices of the planar mesh 1330 in the image data. The image information may include a pixel value (e.g., a scene pixel value) of each of the scene pixels 1491 included in the scene view image or in a texture based on the pixel values.

Referring to FIG. 14, a first scene pixel 1430 may be near or adjacent to a first vertex 1431, a second vertex 1432, and a third vertex 1433 of the planar mesh 1330. Referring to position indices, the first vertex 1431, the second vertex 1432, and the third vertex 1433 may respectively correspond to a first image pixel 1401, a second image pixel 1402, and a third image pixel 1403. Accordingly, the electronic device may determine image pixel values of the first image pixel 1401, the second image pixel 1402, and the third image pixel 1403 as the scene pixel value of the first scene pixel 1430. A second scene pixel 1440 may be at the same or adjacent position as a fourth vertex 1441 on the target plane. The fourth vertex 1441 corresponds to a fourth image pixel 1404, and thus, the electronic device may determine an image pixel value of the fourth image pixel 1404 as the scene pixel value of the second scene pixel 1440. Accordingly, the electronic device may generate the scene view image based on the determined image information.

FIG. 15 illustrates an example of rendering using the motion-calibrated planar mesh. FIG. 15 shows an example in which image vertices are set to some image pixels among image pixels 1520 of image data. For example, image vertices of an image mesh 1528 may be spaced apart by a predetermined interval (e.g., an interval between two image pixels 1520). A top-view image may be rendered for image data captured while the moving body is moving. For example, when the camera sensor includes a fisheye lens, an object 1509 may be captured in the image data in a curved form as shown in FIG. 15. When the image data described above is rendered using a default mesh 1570 according to a comparative example, the object 1509 may be shown with a distorted shape 1507 as shown in FIG. 15. The electronic device according to an example may express the object 1509 in a real/accurate shape 1508 by generating a top-view image from the image data by using a planar mesh 1580 to which the motion of the moving body is applied.

Figure 16:
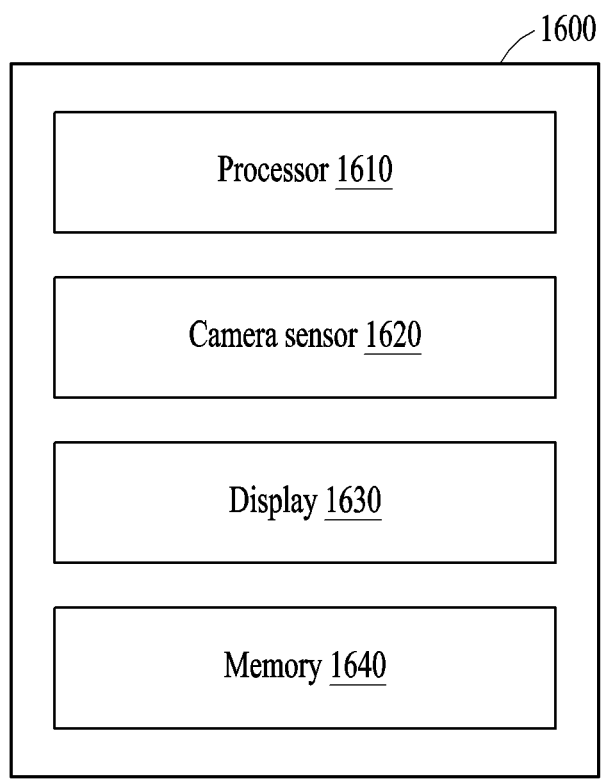
FIG. 16 illustrates an example of a configuration of an electronic device, according to one or more example embodiments.

FIG. 16 illustrates an example of a configuration of an electronic device 1600, according to one or more example embodiments. The electronic device 1600 may include a processor 1610, a camera sensor 1620, a display 1630, and a memory 1640.

The camera sensor 1620 may be disposed on a moving body. The camera sensor 1620 may be disposed on at least one of a front surface, side surface, or rear surface of the moving body. However, the camera sensor 1620 may be disposed on an upper or lower surface of the moving body. The camera sensor 1620 may generate image data (an image) by sequentially scanning scan lines. The camera sensor 1620 may include a wide-angle lens, for example, a fish-eye lens.

The processor 1610 may obtain a planar mesh by using a default mesh based on vertices corresponding to positions where image pixels along a scan line of the camera sensor 1620 are back-projected onto a target plane and a motion of the moving body. The processor 1610 may generate the scene view image from the image data based on the obtained planar mesh. The operation of the processor 1610 is not limited thereto, and the processor 1610 may perform at least some of the operations described above with reference to FIGS. 1 to 15 sequentially or in parallel.

The display 1630 may display the generated scene view image. The display 1630 may provide a surround view monitor (SVM) image without distortion to a user (e.g., a driver) through the top-view image described above. However, implementations are not limited thereto, and the display 1630 may display a color image generated based on the image data of the camera sensor 1620.

The memory 1640 may store at least one of image data, a default mesh, a planar mesh, or a scene view image. The memory 1640 may store data required to perform the operations described above.

The electronic device 1600 may identify a road marking from the generated scene view image. For example, the electronic device 1600 may recognize the road marking from the scene view image (e.g., the top-view image). The road marking may represent a traffic safety sign with letters or symbols drawn on the road to deliver information to road users. The road marking may include, for example, a centerline, lane line, speed limit, guide line, stop line, crosswalk, lane change, and direction.

In addition, the electronic device 1600 may control the movement of the moving body based on a result of identifying the road marking. For example, the electronic device 1600 may adjust at least one of steering, speed, or acceleration of the moving body (e.g., the vehicle) by using a result of identifying the road marking. That is, the view image may inform the decision making of an advanced driver assist system (ADAS). The electronic device 1600 may be implemented as an autonomous vehicle. The electronic device 1600 may establish and implement a road driving plan according to the result of identifying the road marking.

Although an example in which the moving body, on which the electronic device 1600 is mounted/incorporated, is a vehicle is mainly described herein, examples are not limited thereto. The electronic device 1600 may be mounted on an aircraft, ship, robot, drone, or a ship.

For example, the electronic device 1600 may identify an object on a target plane (e.g., the ground). When the electronic device 1600 is implemented as a robot (e.g., a robot cleaner or drone), the object may include an object or obstacle which is a target of the operation. The electronic device 1600 may establish an operation execution plan or a route plan for operation execution based on the result of identifying the object. The electronic device 1600 may execute the established plan.

As described above, the electronic device 1600 removes distortion caused by the rolling shutter from an image of the rolling shutter camera mounted on the moving body, thereby performing more accurate object recognition or other functions.

Although reference is made above to "the electronic device", this phrase refers to any electronic device implementing any of the examples described above; "the electronic device" does imply that only one electronic device is described herein.

The computing apparatuses, the vehicles, the electronic devices, the processors, the memories, the image/camera sensors, the vehicle/operation function hardware, the ADAS/AD systems, the displays, the information output system and hardware, the storage devices, and other apparatuses, devices, units, modules, and components described herein with respect to FIGS. 1-16 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-16 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, in addition to the above disclosure, the scope of the disclosure may also be defined by the claims and their equivalents, and all variations within the scope of the claims and their equivalents are to be construed as being included in the disclosure.

What is claimed is:

1. An electronic device comprising:
   a camera sensor, disposed on a body, and configured to generate an image comprising image data by sequentially scanning scan lines; and
   memory storing instructions configured to cause a processor to:
   obtain a default mesh with vertices corresponding to positions of image pixels along a scan line of the camera sensor and back-projected onto a target plane, the target plane being located and included in a field of view (FOV) of the camera sensor,
   obtain a planar mesh from the default mesh according to motion of the body, and
   generate a scene view image from the image data based on the obtained planar mesh.

2. The electronic device of claim 1, wherein the instructions are further configured to cause the processor to:
   obtain the planar mesh by moving a group of vertices of the default mesh that correspond to a same scan line captured at a scan time point, wherein the moving is based on motion of the body corresponding to the scan time point.

3. The electronic device of claim 1, wherein the instructions are further configured to cause the processor to:
   obtain motions of the body, the motions of the body respectively corresponding to scan time points when lines of the image data were captured by respective scan lines of the camera sensor;
   obtain the planar mesh by:
   for each time point, moving vertices associated with a corresponding scan line according to a displacement that is based on a difference between the corresponding motion of the body at the scan time point and a motion of the body at a reference time point.

4. The electronic device of claim 1, wherein the instructions are further configured to cause the processor to:
   when the body is moving in a straight line, obtain the planar mesh by moving vertices, in the default mesh, and corresponding to a scan line scanned at a scan time point subsequent to the reference time point, in a direction corresponding to the straight line movement of the body.

5. The electronic device of claim 1, wherein the instructions are further configured to cause the processor to:
   obtain the planar mesh by moving vertices corresponding to a same scan time point in the default mesh using a transformation matrix that is a rigid body transformation corresponding to the motion of the body.

6. The electronic device of claim 1, wherein the instructions are further configured to cause the processor to:
   obtain the planar mesh by not-moving vertices in the default mesh that correspond to a reference time point and by moving other vertices of the default mesh based on the motion of the body.

7. The electronic device of claim 1, wherein the instructions are further configured to cause the processor to:
   generate the scene view image from the image data based on a mapping relationship between image pixels of the image data and vertices of the planar mesh.

8. The electronic device of claim 7, wherein the instructions are further configured to cause the processor to:
   determine image information, corresponding to either positions of the vertices or a surrounding position on the target plane, based on pixel values of image pixels mapped to the vertices of the planar mesh in the image data; and
   generate the scene view image based on the determined image information.

9. The electronic device of claim 1, wherein image pixels mapped to at least two vertices among vertices adjacent to each other in the planar mesh are positioned along the same scan line.

10. The electronic device of claim 1, wherein vertices included in the planar mesh are mapped to image pixels belonging to a portion of a field of view of the camera sensor overlapping the target plane.

11. The electronic device of claim 1, wherein image pixels corresponding to a same scan line are spaced apart from each other at regular intervals along a line within the image data.

12. The electronic device of claim 1, wherein vertices of the default mesh are disposed at positions back-projected onto the target plane along directions from a sensing element corresponding to an image pixel mapped to a corresponding vertex toward an origin of the camera sensor based on a position of the camera sensor with respect to the body.

13. The electronic device of claim 1,
    wherein the body is a vehicle and the electronic device is mounted on, affixed to, or incorporated in the vehicle, and
    wherein the camera sensor is positioned at a front surface, rear surface, or side surface of the vehicle.

14. The electronic device of claim 1, wherein the instructions are further configured to cause the processor to:
    identify a road marking from the generated scene view image.

15. The electronic device of claim 1, wherein the instructions are further configured to cause the processor to:

generate the scene view image having a view, including at least a partial region included in a viewing angle of the camera sensor, in the target plane, from a view point of the camera sensor.

16. The electronic device of claim 1, wherein the instructions are further configured to cause the processor to:
generate, as the scene view image, a top-view image of a region, including at least a portion of the planar mesh on the target plane, the top-view image corresponding to a view looking directly down on the target plane; and
output the top-view image through a display.

17. A processor-implemented method, the method comprising:
receiving an image, the image having been generated by a rolling shutter camera sensor that sequentially scans lines in a camera incorporated in a moving apparatus;
obtaining a planar mesh by using a default mesh comprising vertices corresponding to positions where image pixels along a scan line of the camera sensor are back-projected onto a target plane and by using a motion of the moving apparatus, the target plane being located and included in a field of view (FOV) of the camera; and
generating a scene view image from the image data based on the obtained planar mesh.

18. A method comprising:
obtaining an image captured by a rolling shutter camera that is moving through physical space, wherein lines of the image are captured at respective line capture times while the rolling shutter camera is moving;
forming a planar mesh by, for each group of vertices of an initial mesh, translating the vertices of groups in the initial mesh based on motion of the rolling shutter camera at the respective line capture times of the groups, wherein the initial mesh is obtained by back-projecting image pixels along a scan line of the rolling shutter camera onto a target plane, the target plane being located and included in a field of view (FOV) of the rolling shutter camera, and the translation of the vertices in a group depends on the motion of the rolling shutter camera at the group's line capture time; and
generating an image based on the planar mesh.

19. The method of claim 18, wherein the vertices are arranged by back-projecting based on camera parameters of the rolling shutter camera.

20. The method of claim 18, wherein the vertices of the initial mesh are co-planar with respect to each other, and wherein the vertices of the planar mesh are co-planar with respect to each other.

* * * * *